June 15, 1954  C. B. GRAVES  2,681,284
PACKAGE OF LEAVENED DOUGH
Filed Oct. 2, 1952

INVENTOR.
CHARLES B. GRAVES
ATTORNEYS

Patented June 15, 1954

2,681,284

UNITED STATES PATENT OFFICE 2,681,284

PACKAGE OF LEAVENED DOUGH

Charles B. Graves, Webster Groves, Mo., assignor to Sefton Fibre Can Company, St. Louis, Mo., a corporation of Delaware Application October 2, 1952, Serial No. 312,768

6 Claims. (Cl. 99—172)

This invention relates to a package for leavened dough or any material having autogenous pressure characteristics.

The commercial packaging of leavened dough has not heretofore been particularly successful because of the problem of handling the self generating, autogenous, pressure characteristic of the dough at normal room temperature. It is well known that leavened dough, whether in bread or biscuit or other form, can be rendered relatively inactive in a cooled or refrigerated atmosphere. The problem arises from the time they leave the cool, conditioned cabinet in the store until such time as the housewife uses them. If the housewife handles the biscuits according to directions and keeps them in a cool condition, the rising action is minimized and the opening problem is relatively simple. If, however, she keeps them in a warm kitchen for too long a time, the pressure generated in the package is tremendous and, in the present type package, when the lid is removed, or the sidewalls cut, the biscuits have a tendency to split the liner and come out in a mass of dough rather than in the form of biscuits or dough wafers ready to be placed in the baking pan and thence in the oven.

On the other hand, part of the process of producing bread, biscuits and the like, involves the allowance for a period of action of the leavening agents which causes the dough to rise, such period preceding baking of the dough. The commercial packaging of leavened dough is, according to present knowledge, feasible if carried out before the leavening action has progressed very far. There is a "proof" period normally allowed which involves letting the dough wafers rise to fill the package and, in that way, provide a positive check or test on the dough mix. This proof period is normally arrested by chilling or refrigerating the dough. Therefore, when a package is removed from the refrigerated atmosphere and allowed to return to room temperature, the leavening action reestablishes itself and the dough rises, whether or not it is in the package.

One of the problems in the commercial packaging of leavened dough is the type of a package which will withstand the pressure generated by the dough for a reasonable length of time to permit a purchaser of the package to carry it from the store and return it to a domestic refrigerator without the pressure developing to a point where the package can become dangerous. Another difficulty with the commercial sale of packaged dough is the provision of suitable means for opening the package in such a way that pressure therein may be released gradually and without causing the dough to split the container or force its way out of the partly opened package. If the dough is forced out of the package it becomes a mass of dough which bears no resemblance to the original shape and cannot be easily handled or reformed. In certain packages, the pressure generated within the package, when the dough is allowed to expand before opening, makes the package a dangerous article. If not carefully released, portions of the package might react like a projectile because of the enormous pressure caused by the leavening action in the dough.

An important object of the present invention is to provide a package for leavened dough or other articles having autogenous characteristics which will overcome the packaging problems hereinbefore pointed out.

It is another object of this invention to provide a package having inner wrapper means for the leavened dough arranged in such a manner that the internal pressure will be controllably reduced to avoid having the dough subjected to pressure which will force it from the package before the package is completely opened.

Another object of this invention is to provide a package and wrapper type liner which will overcome the difficulties in the commercial handling of leavened dough, and which will avoid the difficulties attendant upon the domestic use thereof.

It is a further object of this invention to provide a package and a liner capable of expanding its internal volume to accommodate the internal pressure condition and thereby avoid the forceful separation of the package sections.

Other objects and advantages of the present invention reside in the package for leavened dough articles, in the liner for wrapping the dough and in the combination of the package and liner as will hereinafter be more particularly pointed out.

The present invention consists, at least in one preferred form, in a tubular container having its opposite ends closed by metallic closure means crimped or secured to the end of the container, and having the body of the container formed of two sections separable, but joined in a telescoping flange connection. The package also consists in an exterior wrapper or label of paperstock which is adhesively secured to the container and provided with an opening element or pull string which will sever the exterior wrapper at the telescoping connection so that the container sections may be axially separated. The package further consists in the provision of a wrapper or internal liner member enclosing the leavened dough and having between its ends, corresponding to the ends of the container, a circumferential or peripheral lap or fold which shortens the liner to a size which will fit within the container, but permit an increase in the size or volume of the liner as the sections of the container are axially separated when the package is opened. The invention further includes within its scope a package and liner which will carry out the aforementioned objections of this invention in a manner as and substantially equivalent to that now to be described in connection with a preferred embodiment shown in the drawings, wherein:

Figure 1:
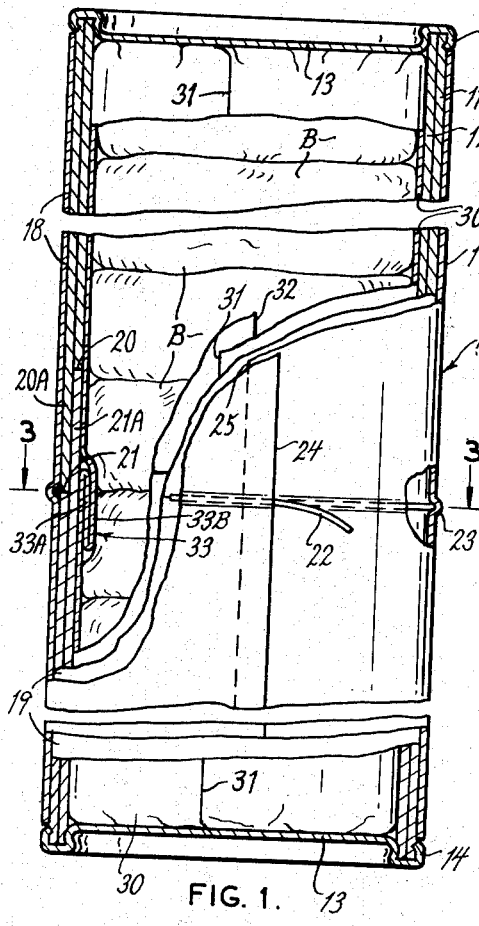
Fig. 1 is a longitudinal broken sectional view of a container suitable for the packaging of leavened dough, which dough has been formed in the shape of biscuits.
Figure 2:
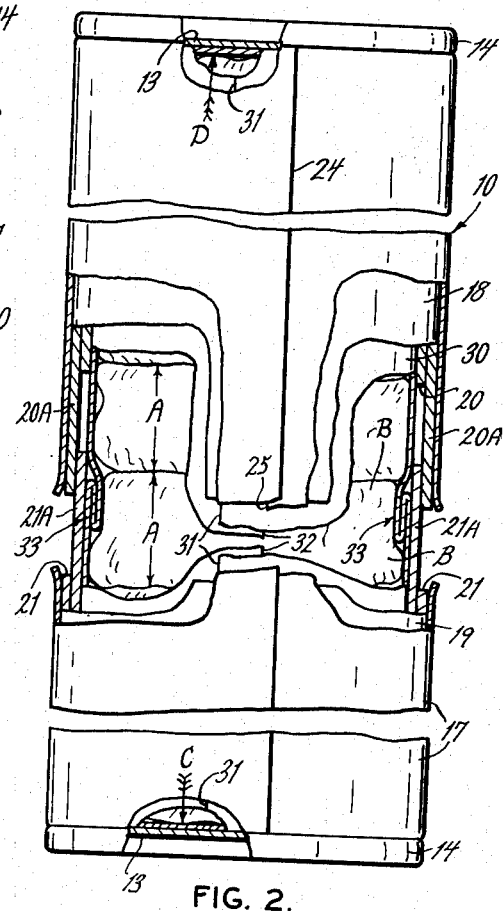
Fig. 2 is a longitudinal elevational view of the container shown in Fig. 1, but having portions of the container and the internal structure thereof broken away to reveal details.

Referring to Figs. 1 and 2, the container 10 has the form of a tube with two wall layers indicated at 11 and 12 which extend from end to end thereof. The opposite ends of the container are closed by suitable means, such as a sheet metal cap 13 having its reversely flanged periphery 14 crimped over the end of the container wall layers 11 and 12. The end closures are identical for the opposite ends of the container and, therefore, the same reference numerals have been assigned thereto.

The container is suitably separated into two sections 18 and 19, at the time of its manufacture, by means of longitudinally off-set and circumferentially directed cuts 20 and 21 in the wall layers 11 and 12. The cut 20 is formed in the interior layer 12 and the cut 21 is formed in the outer layer 11 so that the portions of the respective layers 11 and 12 lying between the circumferentially directed cuts 20 and 21 form flanges 20A and 21A fitting in telescoping relationship. This telescoping or slip fit relationship permits the container sections 18 and 19 to be moved apart in an axial direction over a suitable axial distance before the sections 18 and 19 become physically separated. Fig. 2 shows the sections in a partly separated position.

The container 10 is enclosed by a suitable label or exterior wrapper 17 which may extend over the length of the container between the crimped peripheries 14 of the respective end closures. The label 17 is provided with an opening device in the form of a pull string 22 which is located adjacent or on the circumferential cut line 21 and held in position by the label 17. A length of the pull string 22 is shown encircling the container and lying beneath a circumferential hump or ridge 23 in the label 17. The pull string is provided with a free end so that it may be easily grasped in order to tear the label beginning at the longitudinal edge 24 which overlaps the opposite longitudinal edge 25.

The present embodiment is shown in connection with the packaging of biscuits in the form of dough wafers which are indicated at B in the container 10. The biscuit wafers are made up of a suitable leavened dough and cut with a biscuit cutter to proper size for the container. A suitable number of these biscuit wafers are placed together in a wrapper or liner 30 and deposited in the container 10 from the one remaining open end thereof, after which the final closure cap 13 is crimped into position to complete the package.

The liner 30 may be formed of metallic foil or paper or synthetic sheet material which is suitable for the purpose and possesses the requisite flexibility to fold easily without stiffening or cracking. A section of the paper or foil is cut to a predetermined size, preferably in a rectangular shape with longitudinal margins 31 and 32. A single fold 33 is formed crosswise of the length of the wrapper section so that the wrapper is shortened by the amount utilized in creating the fold 33. In the view of Fig. 1, fold 33 is shown located adjacent the position of the pull string 22. However, this is not necessarily essential, as the fold 33 may be located at other places between the opposite ends of the package.

The liner fold 33 is formed transversely of the longitudinal edges 31 and 32 and intermediate the ends thereof by first folding the liner sheet upon itself to form the lap or bight 33A, and then to reverse the folding operation to form the second lap or bight 33B. In this manner, the fold consists in three layers or plies of the liner sheet material. After the lap fold 33 has been thus formed, a suitable number of biscuit wafers B are placed in side by side relationship on the sheet and the sheet rolled into a cylindrical wrapper about the wafers with the longitudinal margins 31 and 32 lying in overlapping relationship. The opposite open ends of the wrapper or liner 30 may then be suitably folded and tucked in any well known manner to close the ends. No particular reference or disclosure has been made in connection with the tucking or folding of the end portions of this unit, as it is well understood in the wrapping art. After the completely wrapped biscuit wafers have been deposited in the container 10, the final end closure 13 may be crimped into position and the package is allowed to stand for the required proofing period prior to its refrigeration.

The liner 30 with the lap fold 33 intermediate its ends constitutes a wrapper which has a potential internal volume which is greater than the volume of the closed container 10. In other words, the volume of the wrapper is selected, in terms of the expansibility of the lap fold 33, to match at least the increase in the volume of the container 10 when the container sections 18 and 19 are axially moved apart for opening the package. This important relationship between the container 10 and the wrapper 30 is illustrated in Fig. 2. In this view, the sections 18 and 19 of the container 10 are shown in partially separated position so that the full cut lines 20 and 21 permit axial separation of the portions of the container, with the wall layers 11 and 12 sliding on one another.

During the axial movement of the sections 18 and 19, the lap fold 33 will be forced to roll out upon itself due to the axially directed force of the internal pressure, indicated by arrows C and D acting on the tucked ends of the wrapper. The axial forces causing the wrapper to expand, or to extend itself, arise by reason of the autogenous pressure of the wafer dough releasing carbon dioxide gas which acts against the side walls and ends of the container, as is understood. Each of the biscuit wafers exerts axially directed pressure indicated by the arrow A, as well as a radialy outwardly directed force on the side walls. The latter force tends to press the wrapper liner tightly against the walls of the container 10. However, this side wall pressure is partly overcome, during the opening operation of the package, by the effect of the axially directed forces C and D on the closures 13 of the container sections 18 and 19. As a consequence, the lap fold 33 is caused to roll out upon itself until the sliding flanges of the sections 18 and 19 become separated. The opening of the package, therefore, involves expanding or enlarging the volume of the wrapper 30 commensurate with the increase in the volume of the container 10. This is a relatively easily controlled and slow volumetric increase due to the friction, it is believed, between the liner 30 and the container side walls caused by the radially directed pressure.

The success of a package of the present type, in the commercial handling of autogenous pressure materials is attributed to the control which is provided over the pressure within the package during the opening operation thereof. A sudden weakening of any portion of the container structure would permit the internal pressure to seek immediate escape through the weak portion. This would cause tearing or rending of the container walls followed by escape of the dough, resulting in a mass of wafer dough. The control over the opening of the package is provided by the telescoping fit between the container sections 18 and 19 and the provision of the lap fold 33 to allow the pressure within the wrapper 30 to reduce itself to a point where its escape cannot adversely affect the desired condition of the contents.

Figures 4, 5:
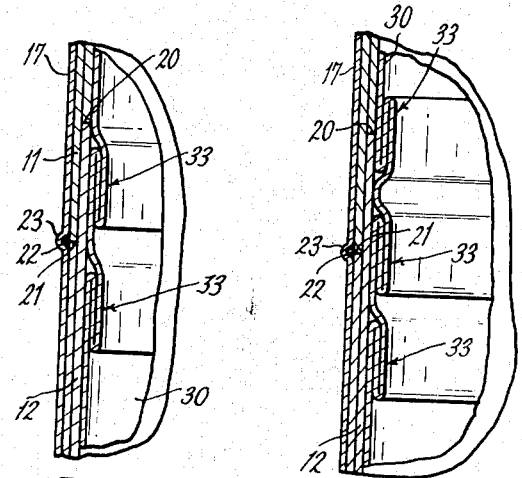
Fig. 4 is a fragmentary longitudinal sectional view of a package showing a modified form of the liner.
Fig. 5 is a fragmentary longitudinal sectional view of a package showing a further modified form of the liner.
Figure 3:
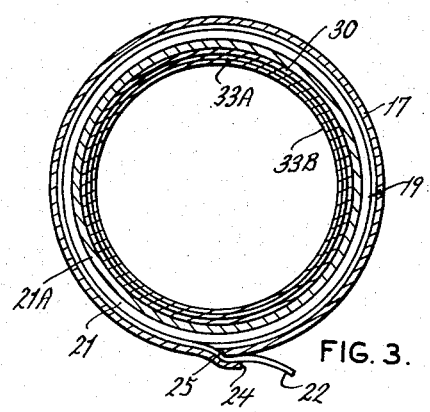
Fig. 3 is a transverse sectional view of the package at the pull string opening means shown at line 3—3 in Fig. 1.

A preferred form of the present invention has been disclosed in Figs. 1, 2, and 3. However, it is within the scope of the present invention to provide the liner 30 with a plurality of lap folds 33 which are located adjacent the position of the tear string 22, all as shown in Fig. 4. A modification of this character might be employed in a package where increased pressure conditions would require a greater measure of control. The control here is obtained in the greater length of wrapper stored up in the multiple folds.

A further modification is shown in connection with Fig. 5, wherein a plurality of folds are provided in the wrapper 30, with certain of the folds oppositely directed to increase the ability of the folds to roll out upon themselves during the opening operation of the container. Here again, the greater increase in the length of the wrapper when the folds are extended may be made use of in connection with the packaging of autogenous pressure material having a higher range of pressures or the use of a package having a longer flanged connection than that shown in Fig. 1.

It has been above pointed out that the liner sheet is provided with a transverse fold and that the dough wafers are wrapped in the liner prior to being placed in the container. It is also within the scope of the present improvement to place the liner with the transverse fold formed therein in the container and to deposit the dough wafers in the lined container by the use of automatic filling machinery. The particular method of preforming the packaging operations is of course a matter of individual choice.

Although not shown, the pull string 22 may be dispensed with and a suitable tear means substituted therefor, one such substitute being a tear tape rolled or disposed under the label in place of the string. The tear tape would act substantially like the pull string to sever the label near the outer separation or cut line 21 between the two sections of the container. An alternative tear means for opening the container would consist in the use of an adhesive strip of transparent material located over the label and overlapping the adjacent peripheral areas of the container sections on each side of the cut line 21. In the later case, the container label would consist of two label portions, one carried by each section of the container. The label portions would meet at the cut line 21 and register the label designs or printed matters thereon without substantial distortion. The application of an adhesive and transparent strip or relatively wide tape, it is believed, would not objectionably obstruct the viewing of the label. The adhesive strip or tape would have a suitable end tab free of exposed adhesive for the purpose of providing means for gripping the same to open the package.

Other modifications will suggest themselves in view of the foregoing disclosure of a preferred embodiment of the present invention and certain modifications thereof. It is to be understood, however, that the foregoing is not to be taken as imposing limitations hereon, except as it may be required by the appended claims.

What I claim is:

1. A dough package wherein the dough has autogenous pressure characteristics activated by warming and substantially inactivated when refrigerated, the package comprising a normally closed container, an inner wrapper filled with and enclosing the dough and substantially filling the container, the wrapper having pairs of opposed edges and a fold in the wrapper extending between one pair of the opposed edges and intermediate another pair of the opposed edges which will unfold and allow expansion of the wrapper upon opening of the container while still maintaining the dough therein.

2. A dough package wherein the dough has autogenous pressure characteristics activated by warming and substantially inactivated when refrigerated, the package including a container comprising two separably joined sections, an inner wrapper filled with and enclosing the dough and being pressed against the container walls by pressure generated by the dough, the wrapper having pairs of opposed edges and a fold in the wrapper extending between one pair of the opposed edges and intermediate another pair of the opposed edges which will unfold and allow expansion of the wrapper upon opening of the container while still maintaining the dough therein.

3. A dough package wherein the dough has autogenous pressure characteristics activated by warming and substantially inactivated when refrigerated, the package comprising a container composed of two sections, an inner wrapper filled with and enclosing the dough and substantially filling the container, a fold in said wrapper intermediate the ends thereof which will unfold and allow expansion of the wrapper upon opening of the container while still maintaining the dough therein, and tear means about said container connectnig the two sections to hold the latter assembled.

4. A dough package wherein the dough has autogenous pressure characteistics activated by warming and substantially inactivated when refrigerated, the package comprising a tubular container capped at its opposite ends, an inner wrapper filled with and enclosing the dough and substantially filling the container, a fold in said wrapper intermediate the ends thereof which will unfold and allow expansion of the wrapper upon opening of the container while still maintaining the dough therein, and tear means on said container to be torn therefrom for opening of the container.

5. A dough package wherein the dough has autogenous pressure characteristics activated by warming and substantially inactivated when refrigerated, the package comprising a normally fixed volume container, an inner wrapper filled with and enclosing the dough and being pressed against the container walls by pressure generated by the dough, the wrapper having pairs of opposed edges and a fold in the wrapper extending between one pair of the opposed edges and intermediate another pair of the opposed edges which will unfold and allow expansion of the wrapper upon opening of the container while still maintaining the dough therein, and tear means surrounding the container for opening the same.

6. A dough package wherein the dough has autogenous pressure characteristics activated by warming and substantially inactivated when refrigerated, the package comprising a container having two tubular sections each closed at one end and each having a tubular flange, one of said section flanges telescopingly fitting within the flange of the other section, an inner wrapper filled with and enclosing the dough and substantially filling the container, at least one circumferential flat fold in the wrapper intermediate the ends thereof which will unfold and allow expansion of the wrapper upon opening of the container while still maintaining the dough therein, a package label adhesively connecting said tubular sections for holding the latter in telescoped assembly, and a pull string having one end exposed and the remainder thereof encircling said tubular sections at the end of the outer one of said flanges underneath the label.

References Cited in the file of this patent

UNITED STATES PATENTS

| Number | Name | Date |
| --- | --- | --- |
| Re. 18,426 | Willoughby | Apr. 19, 1932 |
| 1,006,087 | Hertzberg | Oct. 17, 1911 |
| 1,904,741 | Lorber | Apr. 18, 1933 |
| 1,988,091 | Schumacher | Jan. 15, 1935 |
| 2,429,538 | Wood | Oct. 21, 1947 |
| 2,478,618 | Armstrong et al. | Aug. 9, 1949 |